United States Patent [19]

Reiss

[11] 4,174,141
[45] Nov. 13, 1979

[54] ROLLER BEARING WITH SYNCHRONIZED CAGE RING AND STABILIZING RING

[76] Inventor: Karl Reiss, c/o/ Dr. Bernhard H. Geissler, 1321 Hampden Rd., Bartlesville, Okla. 74003

[21] Appl. No.: 836,038

[22] Filed: Sep. 23, 1977

[30] Foreign Application Priority Data

Sep. 29, 1976 [DE] Fed. Rep. of Germany ....... 2643773

[51] Int. Cl.² .............................................. F16C 19/40
[52] U.S. Cl. .................................. 308/206; 308/216; 308/217
[58] Field of Search ............... 308/183, 209, 206, 216, 308/202, 217–218, 200, 199

[56] References Cited

U.S. PATENT DOCUMENTS

| | | | |
|---|---|---|---|
| 1,796,813 | 3/1931 | Taylor | 308/206 |
| 2,120,533 | 6/1938 | Tillson | 308/206 |

*Primary Examiner*—Douglas C. Butler

[57] ABSTRACT

A roller bearing comprising an inner ring, a concentric outer ring and a plurality of supporting rollers as well as separating rollers is improved by a cage ring which is concentric and rigidly attached to either the inner or the outer ring. This cage ring holds the separating rollers in their position by engaging with an area of these separating rollers having a different radius from that portion of the separating rollers that engages with the supporting rollers. A specific ratio of the different radii that is important for the synchronous movement of the various parts in the bearing is given.

2 Claims, 10 Drawing Figures

ROLLER BEARING WITH SYNCHRONIZED CAGE RING AND STABILIZING RING

The present invention relates to roller bearings. More specifically, the present invention relates to improved roller bearings having reduced friction.

BACKGROUND OF THE INVENTION

Known roller bearings consist essentially of an inner ring, a concentric outer ring, and a plurality of supporting rollers arranged between these two rings. Such roller bearings are utilized for a variety of technical applications, particularly for supporting axles. The axle is generally connected to the inner ring, whereas the outer ring is attached to a housing or frame.

Known roller bearings avoid the friction between supporting rollers by arranging a cage loosely between the inner ring and the outer ring, the cage guiding each supporting roller separately. The friction between the supporting roller and the cage is not avoided by these roller bearings.

Other roller bearings avoid the friction between the roller parts by utilizing a flexible belt partially surrounding the supporting rollers and separator rollers. The main disadvantage of these roller bearings resides in the sensitive belt that is subjected to considerable bending deformations.

Another roller bearing has been described in the art which provides a pair of separating rollers between adjacent load rollers. Each pair of the separating rollers are held in position by a surrounding cage ring. This bearing has the disadvantage of a rather large number of elements since twice as many separating rollers have to be used as there are supporting rollers and at least as many cage rings have to be used as there are supporting rollers.

THE INVENTION

It is thus one object of this invention to provide a novel roller bearing.

Another object of this invention is to provide a roller bearing with reduced friction.

A further object of this invention is to provide a roller bearing with a limited number of parts.

These and other objects, advantages, details, features and embodiments of this invention will become apparent to those skilled in the art from the following detailed description of the invention, the attached claims, and the drawing in which:

Figure 1:
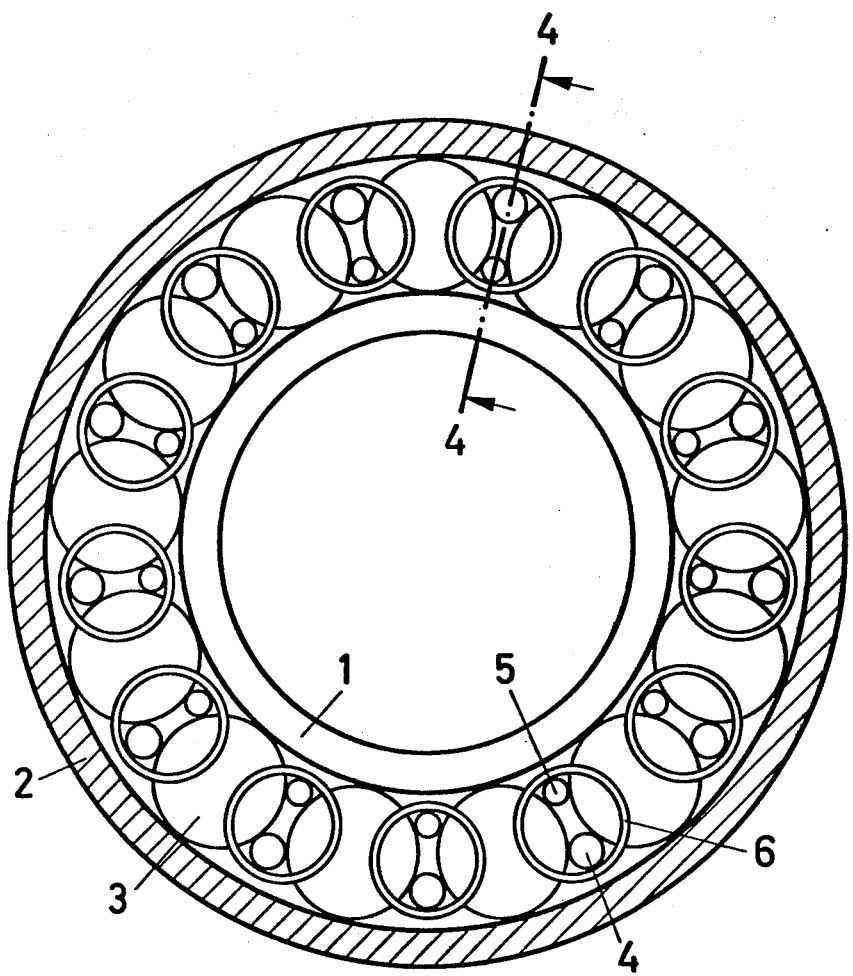
FIG. 1 is a view of a bearing.

In accordance with this invention, there is provided a roller bearing that is essentially free of friction between the bearing parts and at the same time operates without a deformation of the parts of the bearing. Furthermore, the roller bearing in accordance with this invention is constructed for simple elements and can be used without the use of lubricants.

The bearing of this invention comprises an outer ring, a concentric inner ring, and supporting rollers arranged between these rings. All the axes of the rollers and rings described in the following are parallel to each other. The roller bearing in accordance with this invention is characterized by the provision of separating rollers that are arranged between the supporting rollers in such a manner that the separating rollers touch the supporting rollers and separate them from each other, that the separating rollers do not, however, touch the inner roll surface of the outer ring and the outer roll surface of the inner ring; the separating rollers are held in their position in accordance with this invention by at least one cage ring which touches or engages with the separating rollers in roll areas outside of those roll areas in which the separating rollers engage with or touch the supporting rollers.

More specifically, the roller bearing of the present invention comprises an inner ring having an outer roll surface with an outer roll radius and an outer ring having an inner roll surface with an inner roll radius. A plurality of supporting rollers are arranged between the inner and the outer roll surfaces. The supporting rollers have a roll surface with a diameter that is approximately the difference between the inner roll radius and the outer roll radius of the outer and inner ring. In accordance with this invention, a separating roller having a first roll area with a first radius in which the separating roller engages with the supporting roller and at least one second roll area with a second roll radius is provided between every one of two neighboring supporting rollers. A cage ring is concentric to the inner and outer ring and is rigidly connected to or forms one piece with either the inner or the outer ring. This cage ring has a roll area with a cage radius in which the cage ring contacts the second roll area of the separating rollers. In accordance with this invention, the radii mentioned above for synchronous and friction-free operation of the bearing has to be in such a relationship that the ratio of the second roll radius to the first roll radius equals the ratio of the cage radius to that roll radius of the roll surface of that ring or the outer or inner ring to which the cage ring is connected. Specifically, therefore, the ratio of the first roll radius to the second roll radius equals the ratio of the cage radius and the inner roll radius of the outer ring when the cage radius is connected to the outer ring and equals the ratio of the cage radius to the outer roll radius when the cage ring is connected to the inner ring.

As pointed out above, the roll areas of the inner ring, the outer ring, the supporting ring, and the separating ring as well as the cage ring all either have the same axis or have a parallel axes. The roll surfaces preferably are circular cylindrical.

In order to avoid an axial separation of the elements of the bearing, the individual elements are preferably provided with shoulders or flanges. These shoulders are made and formed in a conventional manner in the same way as they are formed in known bearings. A detailed description of these shoulders can therefore be avoided.

The diameter of the supporting roller is equal to the difference of the radius of the inner roll surface of the outer ring and the radius of the outer roll surface of the inner ring. The free distance between the supporting rollers is smaller than the diameter of the roll surface with which the separating roller engages the supporting roller. Preferably, the free distance between the supporting rollers is as small as possible but still big enough to avoid any touching of neighboring supporting rollers.

The bearing can be made from standard materials such as stainless steel. Since the bearing operates essentially friction free, also less abrasion-resistant materials can be used. The surface of the roll elements can, for instance, be made from polytetrafluoroethylene or other polymers such as polyphenylene sulfide.

The following description of the drawing, as well as the explanation of certain mathematical relationships, are intended to illustrate further preferred embodiments of the invention without undue limitation thereof.

All the bearings shown in the drawing comprise an inner ring 1, a concentric outer ring 2 and a plurality of supporting rollers 3. The number n of supporting rollers is limited by the relationship $$3 \leq n \leq \frac{180°}{\text{Arc sin} \frac{q}{RI + q}}$$

wherein q is the radius of a supporting roller 3 and RI is the radius of the outer roll surface of the inner ring 1. The bearing shown in FIG. 1 has thirteen supporting rollers.

Figure 4:
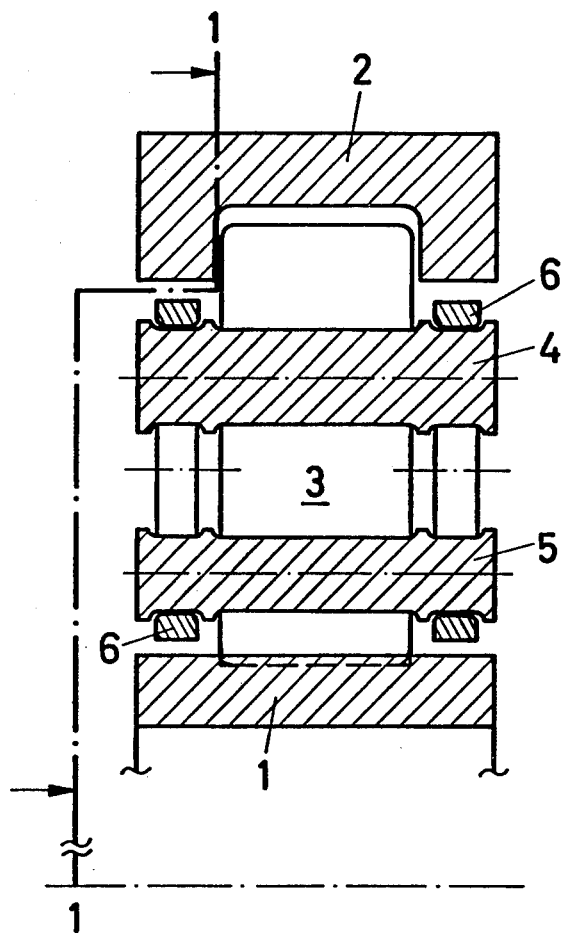
FIG. 4 is a sectional view of the bearing along line 4—4 of FIG. 1.

The bearing shown in FIGS. 1 and 4 is provided with separating rollers 4 and 5 that keep the supporting rollers 3 separate from each other. Two separating rollers 4 and 5 are provided between every two neighboring supporting rollers 3. The bearing shown in FIGS. 1 and 4 thus is provided with n supporting rollers and 2n separating rollers.

Every pair of separating rollers 4 and 5 that are arranged between the same supporting rollers 3 are held together at both sides of the bearing by cage rings 6. These cage rings 6 engage with their inner roll surfaces the outside surfaces of the separating rollers.

In case of the bearing of FIGS. 1 and 4, the roll surfaces in which the separating rollers 4 and 5 engage the supporting rollers 3 and the roll surfaces in which the separating rollers engage the cage rings 6 do not have to have the same radius. For a friction-free operation, it is only significant that the circumferential speeds of the roll surfaces with which the separating rollers engage the cage ring are the same for both the separating rollers 4 and 5.

Figure 7:
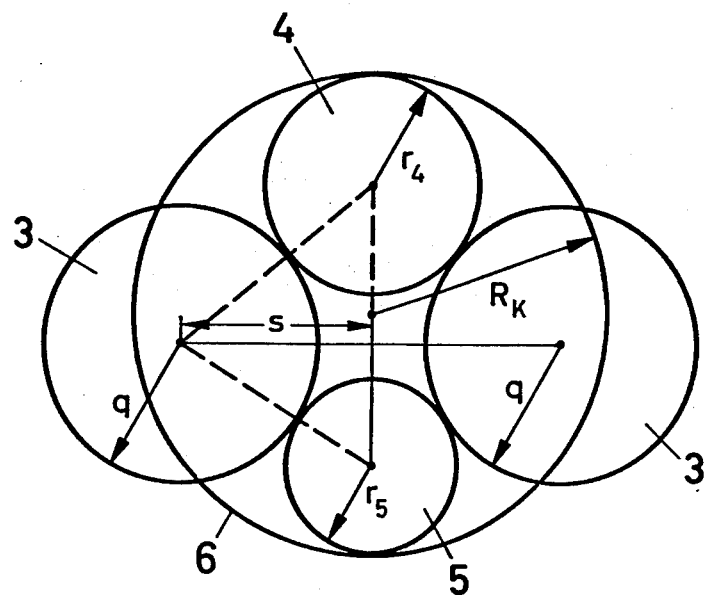
FIGS. 7 and 8 are schematical sketches for calculating the data of the bearing and the synchronous radii.

For a calculation of the data of the bearing, reference is made to FIG. 7. In this figure, the following abbreviations are used:
q = radius of the supporting roller 3
$r_4$ = radius of the separating roller 4
$r_5$ = radius of the separating roller 5
RK = radius of the cage ring
s = distance between the axis of adjacent supporting rollers The following relationship exists between these measurements:

$$RK = \tfrac{1}{2}(r_4 + r_5 + \sqrt{(q+r_4)^2 - s^2} + \sqrt{(q+r_5)^2 - s^2})$$

With this equation, the radius of the cage ring can readily be calculated. Further relations can be derived from FIG. 7 by simple geometry.

In accordance with the preferred embodiment of this invention, only one separating roller 4 or 5 is provided between the supporting rollers 3. In this embodiment, n supporting rollers 3 and n separating rollers 4 (or respectively 5) are provided for. These n separating rollers are held together by a cage ring 6 on each side of the bearing. This cage ring 6 is concentric to the inner ring 1 and the outer ring 2.

Figure 5:
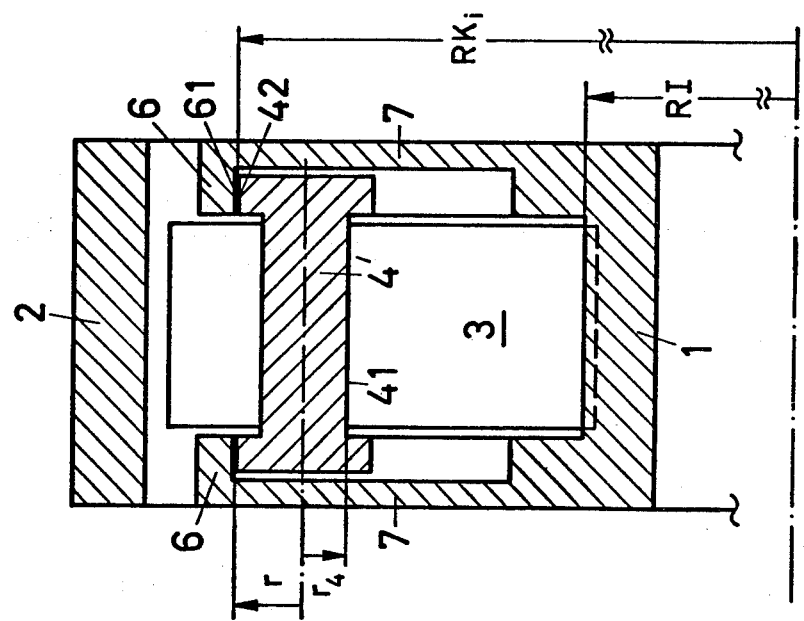
FIG. 5 is a sectional view of the bearing along line 5—5 of FIG. 2.
Figure 2:
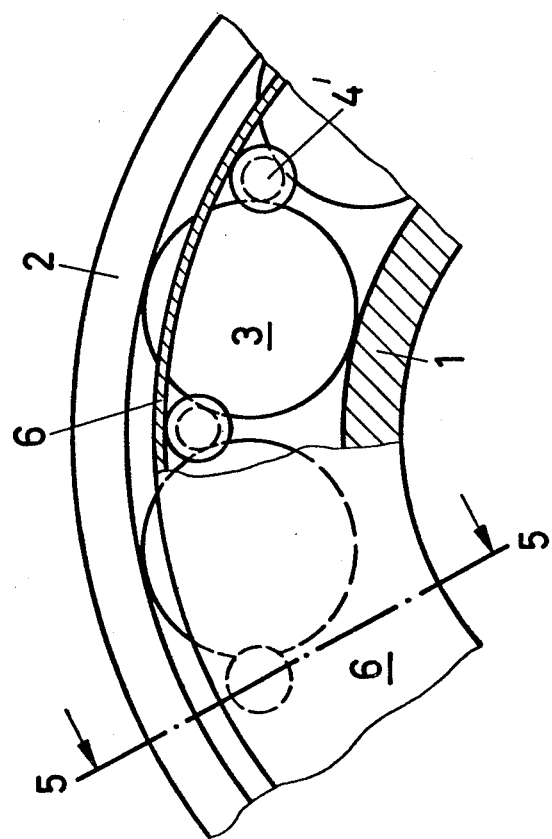
FIGS. 2 and 3 are partial views of an embodiment of the bearing.
Figure 6:
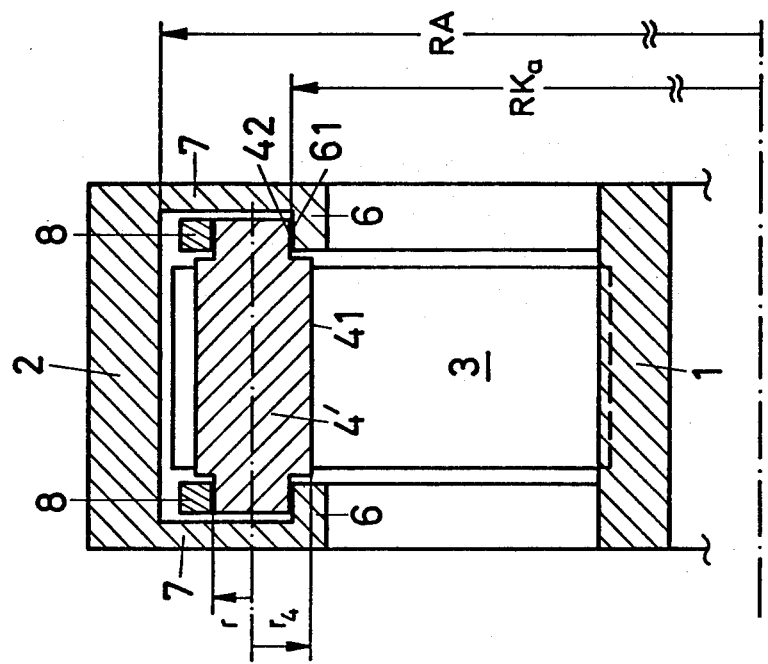
FIG. 6 is a sectional view of the bearing along line 6—6 of FIG. 3.
Figure 3:
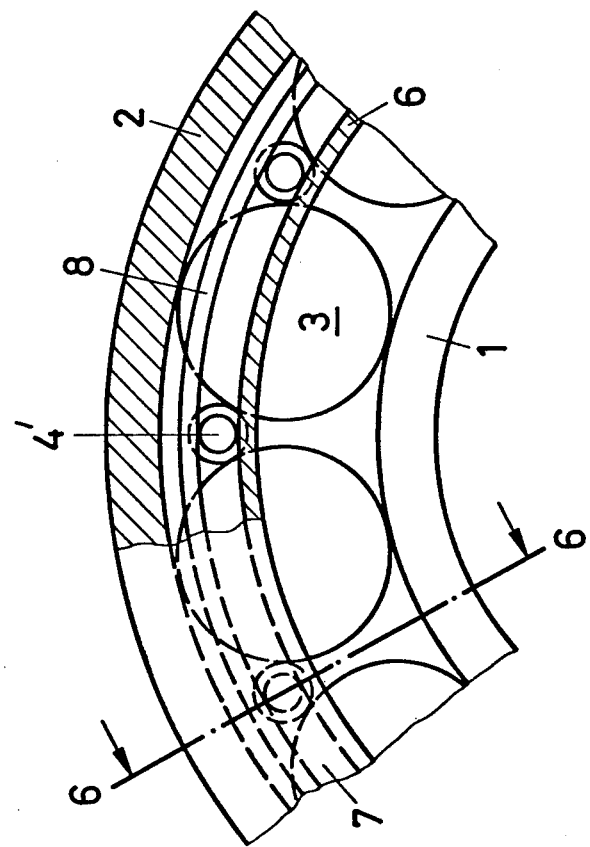

Two examples for the last-mentioned embodiment of the bearing in accordance with this invention are shown in FIGS. 2 and 5 as well as in FIGS. 3 and 6, respectively. In FIGS. 2 and 3 only a portion of the bearing circumference is shown. FIGS. 5 and 6 show sectional views along lines 5—5 or respectively 6—6 through the bearings shown in FIGS. 2 and 3. As shown in FIGS. 2 and 5, the cage ring 6 is rigidly connected with the inner ring 1 via a connector ring 7. Correspondingly, the cage ring 6 in the embodiment of FIGS. 3 and 6 is rigidly connected to the outer ring 2 by a connector ring 7. It is to be emphasized that the cage ring and the inner or respectively outer ring to which this cage ring is rigidly connected can also form one single piece.

In case of the bearing in accordance with FIGS. 3 and 6 the separating rollers 4' can move radially outwardly. Therefore, on either side of the bearing, an additional stabilizing ring 8 is provided for. This stabilizing ring 8 holds the separating rollers together by engaging with them on its inside. The stabilizing rings 8 also are concentric to the inner ring 1 and the outer ring 2.

In order to achieve a friction-free operation of the bearing, the radii of four of the roll surfaces 41 in which the separating rollers 4' and the supporting rollers 3 touch each other, the radii r of the roll surfaces 42 in which the separating rollers 4' and the cage rings 6 touch each other, the radius RI of the outer roll surface of the inner ring, the radius RA of the inner roll surface of the outer ring, as well as the radii $RK_a$ or respectively $RK_i$ of the roll surfaces of the cage rings 6 have to be in a specific synchronous relationship. This relationship follows from the first condition that the angular velocities of the cage ring 6 and the inner ring 1 in the example of FIGS. 2 and 5 (or respectively of the cage ring 6 and the outer ring 2 in the examples of FIGS. 3 and 6) have to be equal, from the second condition that the angular velocities of the roll surfaces 41 and 42 are equal to each other, from the third condition that the circumferential speed of the outer roll surface of the inner ring and the roll surface 41 have to be equal to each other and from the fourth condition that the circumferential speed of the roll surface 42 and the roll surface 61 of the cage ring are equal to each other. Based on these conditions, the following relationships are derived:

$$\frac{r}{r_4} = \frac{RK_i}{RI} \text{ (FIGS. 2 and 5)}$$

$$\frac{r}{r_4} = \frac{RK_a}{RA} \text{ (FIGS. 3 and 6)}$$

Figure 8:
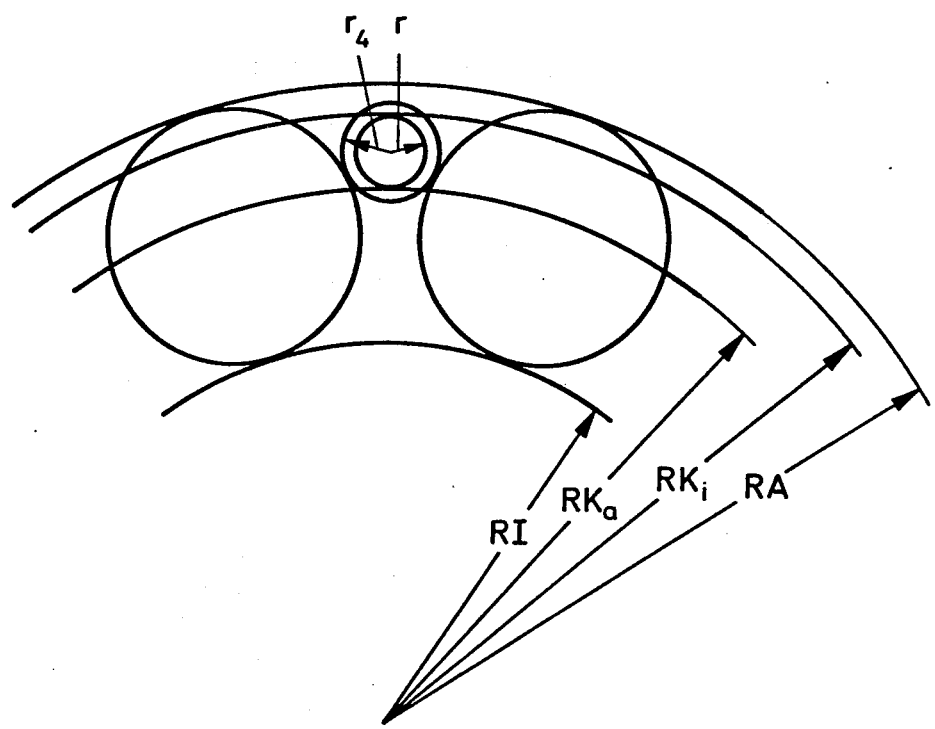

These equations can be readily understood and derived when referring to FIG. 8 illustrating the various radii.

Figure 10:
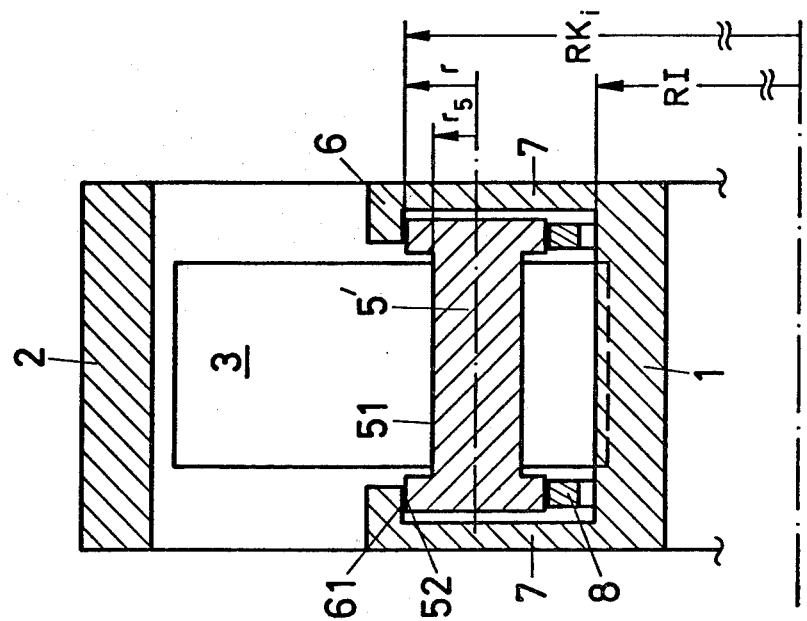
FIGS. 9 and 10 show partial cross-sectional views of further embodiments of the bearing.
Figure 9:
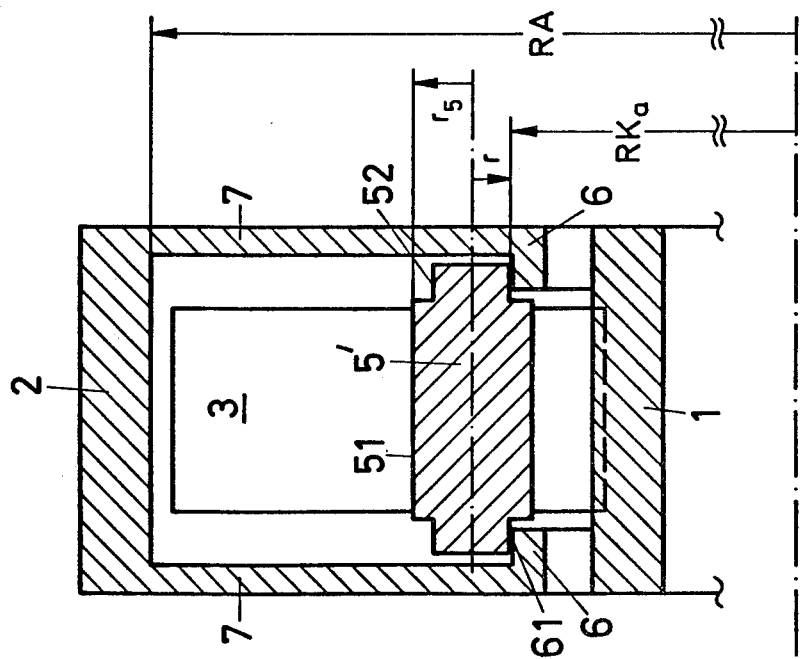

The two examples described utilize separating rollers 4' that are arranged with their axes outside of the cylinder that is defined by the movement of the axes of the supporting rollers 3 around the main bearing axis. Correspondingly, bearings are within the scope of this invention that are provided with separating rollers 5', the axes of which are arranged inside of the last-mentioned cylinder formed by the motion of the axes of the supporting rollers 3. For these embodiments, only the respective cross-sectional views are shown in FIGS. 9 and 10. The cage rings 6 touch with their outer roll surfaces 61 in the example of FIG. 9 the roll surfaces 52 of the separating rollers 5' which in turn with their roll surfaces 51 touch or engage with the supporting rollers 3. The cage rings 6 are rigidly connected by connector ring 7 with the outer ring. In this example, the synchron equation becomes $$(r/r_5) = (RK_a/RA)$$

In the embodiment shown in FIG. 10, the inner ring is rigidly connected to the cage ring 6. Since in this example, the separator rollers 5' can move radially inwardly, stabilizing rings 8 are provided for, which separate and support the separating rollers 5' along their external roller surfaces. The synchron equation in this example becomes $$(r/r_5) = (RK_i/RI)$$

The roller bearings of this invention can be readily built. The bearing shown in FIGS. 1 and 4 is assembled all the way to the last cage ring 6. This last cage ring is built in by slightly deforming this ring or the other rings. In case of the other embodiments, the assembly is evident. In some of the embodiments, a ring has to be attached after insertion of the supporting and separating rollers. This ring can be attached, for instance, by threading it on.

The main advantages of the bearing in accordance with this invention are connected to the fact that the bearing operates free of friction and does not deform the elements of the bearing. The roller bearings of this invention therefore can be utilized without lubrication, which is particularly important in their use in connection with space applications or in vacuum apparatus as well as for underwater uses. Since the bearings of this invention operate friction free, the period of use of these bearings is high.

Reasonable variations and modifications which will become apparent to those skilled in the art can be made from this invention without departing from the spirit and scope thereof.

I claim:

1. A roller bearing comprising
   (a) an inner ring having an outer roll surface with an outer roll radius RI,
   (b) an outer ring having an inner roll surface with an inner roll radius RA,
   (c) a plurality of supporting rollers arranged between said inner ring and said outer ring and having a diameter of approximately the difference between the inner roll radius and the outer roll radius,
   (d) one separating roller arranged between every two neighboring supporting rollers such as to contact them and keep them separate, said separating roller, having a first roll area with a first radius r4 in which the separating roller engages with the supporting rollers and at least one second roll area with a second roll radius r, with the axis of all the separating rollers arranged outside of a cylinder defined by the path of the axis of the supporting rollers,
   (e) a cage ring being concentric to the inner and outer ring and being rigidly connected to the outer ring and having a roll area with an outer cage roll radius $RK_a$ in which the cage ring contacts the second roll area of the separating rollers, the radii being defined by the equation $$(r/r_4) = (RK_a/RA), \text{ and}$$

(f) a stabilizing ring separate from said cage ring and concentric to the inner and outer ring and having an inner roll surface contacting the separating rollers and holding said separating rollers together.

2. A roller bearing comprising
   (a) an inner ring having an outer roll surface with an outer roll radius RI,
   (b) an outer ring having an inner roll surface with an inner roll radius RA,
   (c) a plurality of supporting rollers arranged between said inner ring and said outer ring and having a diameter of approximately the difference between the inner roll radius and the outer roll radius,
   (d) one separating roller arranged between every two neighboring supporting rollers such as to contact them and keep them separate, said separating roller having a first roll area with a first radius r5 in which the separating roller engages with the supporting rollers and at least one second roll area with a second roll radius r, with the axis of all the supporting rollers arranged inside of the cylinder defined by the path of the axis of the supporting rollers,
   (e) a cage ring being concentric to the inner and outer ring and being rigidly connected to the inner ring and having a roll area with an inner cage roll radius $RK_i$ in which the cage ring contacts the second roll area of the separating rollers, the radii being defined by the equation $$r/r_5 = RK_i/RI, \text{ and}$$

(f) a stabilizing ring separate from said cage ring and concentric to the inner and outer rings and having an outer roll surface contacting the separating rollers and keeping said separating rollers apart.

* * * * *